US 7,070,286 B2

(12) United States Patent
Koyama

(10) Patent No.: US 7,070,286 B2
(45) Date of Patent: Jul. 4, 2006

(54) PROJECTOR WITH PROJECTION LENS HAVING A ZOOM FUNCTION

(75) Inventor: Fumio Koyama, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 632 days.

(21) Appl. No.: 09/955,162

(22) Filed: Sep. 19, 2001

(65) Prior Publication Data

US 2002/0080289 A1    Jun. 27, 2002

(30) Foreign Application Priority Data

Sep. 20, 2000  (JP) .............................. 2000-285933

(51) Int. Cl.
  G03B 3/00   (2006.01)
  G03B 21/14  (2006.01)
  G09G 3/36   (2006.01)
  G09G 5/02   (2006.01)
  G02F 1/1335 (2006.01)

(52) U.S. Cl. .................. 353/101; 353/69; 353/121; 345/88; 345/98; 345/600; 345/690; 349/5

(58) Field of Classification Search ............. 353/101, 353/69, 121; 345/88, 98, 600, 589, 602, 345/690; 349/5
See application file for complete search history.

(56) References Cited

U.S. PATENT DOCUMENTS

| 6,195,209 B1 * | 2/2001 | Kreitzer et al. ............. 359/649 |
| 6,431,711 B1 * | 8/2002 | Pinhanez ...................... 353/69 |
| 6,450,647 B1 * | 9/2002 | Takeuchi ...................... 353/69 |
| 6,704,008 B1 * | 3/2004 | Naito et al. ................. 345/207 |
| 6,756,991 B1 * | 6/2004 | Koyama ...................... 345/602 |

FOREIGN PATENT DOCUMENTS

| JP | A-4-240979  | 8/1992  |
| JP | 08-289191   | 11/1996 |
| JP | 09-318909   | 12/1997 |
| JP | A-10-171045 | 6/1998  |
| JP | 11-069264   | 3/1999  |

* cited by examiner

*Primary Examiner*—W. B. Perkey
*Assistant Examiner*—Magda Cruz
(74) *Attorney, Agent, or Firm*—Oliff & Berridge, PLC

(57) ABSTRACT

A projector in accordance with the invention includes a projection lens having a zoom function that forms a projected image corresponding to an image signal on a screen, a zoom state detection section that detects a zoom state of the projection lens, and an uneven color correction section that performs uneven color correction on the image signal based on a detected zoom state.

7 Claims, 2 Drawing Sheets

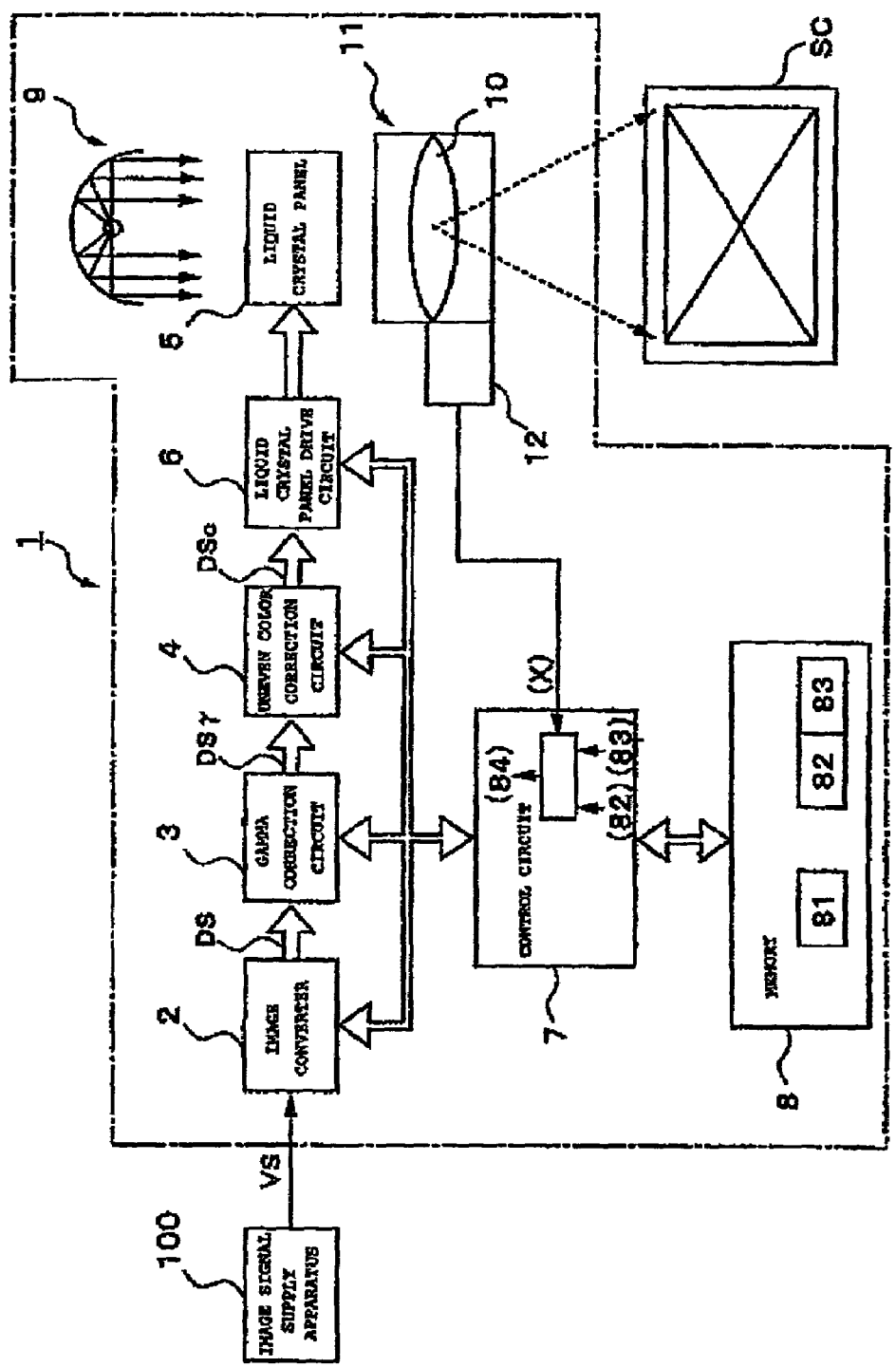
[FIG. 1]

[FIG. 2]
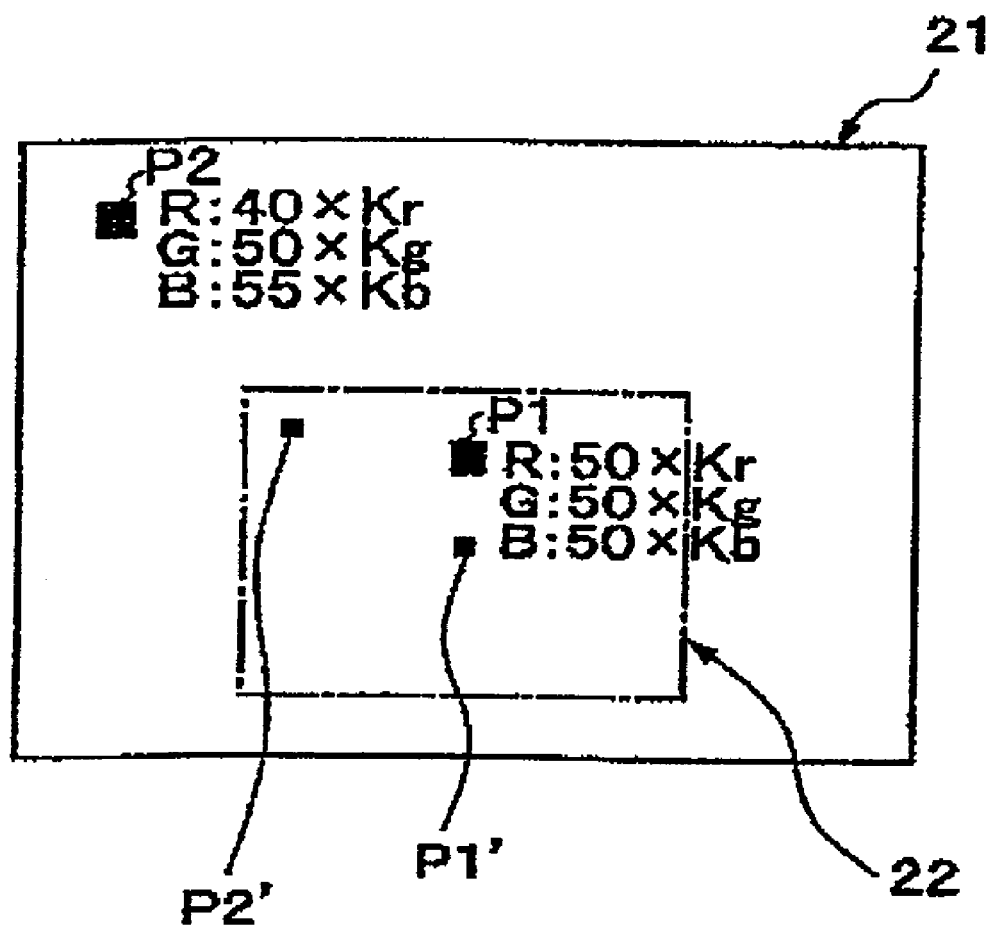

PROJECTOR WITH PROJECTION LENS HAVING A ZOOM FUNCTION

BACKGROUND OF THE INVENTION

1. Field of Invention

The present invention relates to a device that corrects uneven color of an image that is projected by a projector that includes a projection lens with a zoom function. The invention also relates to a method of correcting uneven color of such a projected image.

2. Description of Related Art

A related art projector (projection type display apparatus) is a type of image display apparatus that projects and displays an image, which is formed on a display device, such as a liquid crystal panel, digital micromirror device (DMD: registered trademark of Texas Instruments), and CRT, for instance, on a screen through a projection lens. For example, a transmission type liquid crystal projector is arranged such that a light beam from a light source is modulated according to an image signal transmitted through a liquid crystal panel, and an image formed by the modulation is projected and displayed on a screen through a projection lens. A lens with a zoom function is ordinarily utilized as a projection lens of the projector in order to enlarge and reduce an image projected on the screen within a predetermined range.

It is preferable that a projected image displayed on a screen be uniform without uneven color. Actually, however, uneven color often occurs in a projected image due to the dispersion, for example, in the input/output characteristics of a display device, such as a liquid crystal panel, in the electric characteristics of a signal processing circuit of an image signal, and in the optical characteristics of an optical system.

Thus, an uneven color correction circuit is mounted on a related art projector to correct the image data of a pixel in which uneven color occurs so as to suppress uneven color. Uneven color correction data for correcting image data is determined, for example, as described below. First, a uniform image of halftone (hereinafter "solid image"), typically, a gray solid image is projected and displayed, and the projected image being displayed is photographed with a video camera or the luminance of the projected image is measured with a luminance meter, thereby measuring the distribution of the uneven color of the projected image. Next, appropriate uneven color correction data is determined by repeating the adjustment of the image data of a pixel in which uneven color occurs and the measurement of the uneven color which occurs in the projected image of the image data after the adjustment. The thus obtained correction data is previously stored in a ROM, and the uneven color correction circuit corrects the image data with reference to the uneven color correction data.

SUMMARY OF THE INVENTION

However, the related art uneven color correction method does not take a zoom state of a projection lens into consideration. Accordingly, even if no uneven color occurs in a projected image in a particular zoom state, there is a possibility that uneven color, which is not negligible, occurs in the projected image when the zoom state changes. One of the reasons that uneven color of a projected image varies depending upon a zoom state is that the quantity of light which passes through a liquid crystal panel varies according to an amount of zoom, for example, in a transmission type liquid crystal projector.

As described above, the related art uneven color correction method of the projector is subject to the problem that a projected image without uneven color cannot always be created regardless of a zoom state, because a zoom state of a projection lens is not taken into consideration.

In view of the above point, the present invention provides an uneven color correction method of a projector capable of forming a projected image without uneven color or a projected image in which uneven color is suppressed at all times regardless of a zoom state of a projection lens.

The present invention also provides a projector that performs uneven color correction by the uneven color correction method.

To address the above problem, according to the present invention, a projector is provided that includes a projection lens with a zoom function to form a projected image corresponding to an image signal on a screen; a zoom state detection device that detects a zoom state of the projection lens; and an uneven color correction section that performs uneven color correction on the image signal based on a detected zoom state.

Here, the uneven color correction section may include a memory in which uneven color correction data according to the zoom state is stored.

Further, the uneven color correction section may include a control circuit and an uneven color correction circuit, the memory may store and hold first and second uneven color correction data according at least to first and second zoom states, the control circuit may calculate the uneven color correction data in a zoom state between the first and second zoom states based on the first and second uneven color correction data, and the uneven color correction circuit may perform uneven color correction on the image signal using the calculated uneven color correction data.

A projector that utilizes a liquid crystal light bulb is an exemplary type of projector to which the present invention can be applied.

In contrast, the present invention provides a method of correcting uneven color of a projector that forms a projected image corresponding to an image signal on a screen by using a projection lens with a zoom function. The method includes performing uneven color correction on the image signal in accordance with a zoom state of the projection lens.

In this case, the uneven color correction may be performed by a zoom state detection step of detecting a zoom state of the projection lens; an uneven color correction data calculation step of calculating uneven color correction data according to a detected zoom state; and an uneven color correction step of performing uneven color correction on the image signal using the calculated uneven color correction data.

At the uneven color data calculation step, uneven color correction data corresponding to the detected zoom state may be selected from a plurality of sets of uneven color correction data corresponding to previously stored and held zoom states.

BRIEF DESCRIPTION OF THE DRAWINGS

FIG. 1 is a schematic showing significant aspects of a transmission type liquid crystal projector to which the present invention is applied;

FIG. 2 is a schematic that shows a method of calculating uneven color correction data.

DETAILED DESCRIPTION OF PREFERRED EMBODIMENTS

An embodiment of a projector to which the present invention is applied will be described below with reference to the drawings. FIG. 1 is a schematic of significant aspects of an embodiment of a transmission type liquid crystal projector that displays a color image. As shown in FIG. 1, the liquid crystal projector 1 of the present embodiment includes an image converter 2 that subjects an image signal VS supplied from an image signal supply apparatus 100 acting as an external unit to predetermined signal processing, a gamma correction circuit 3 that subjects an image signal DS supplied from the image converter 2 to gamma correction, an uneven color correction circuit 4 that subjects an image signal DSγ that has been subjected to the gamma correction to uneven color correction processing, and a liquid crystal panel drive circuit 6 that drives a liquid crystal panel 5 based on an image signal DSc that has been subjected to the uneven color correction.

Further, the liquid crystal projector 1 includes a control circuit 7 formed of a CPU, for instance. The control circuit 7 controls the drive of the respective circuits 2, 3, 4, and 6 based on various types of information held in a memory 8. Various non-volatile memories, such as an EPROM, EEPROM, and FROM are used as the memory 8.

The image converter 2 converts an input image signal VS into the image signal DS that can be input to the liquid crystal panel 5, and then outputs the image signal DS. The image signal DS includes a vertical synchronization signal, a horizontal synchronization signal, and a clock signal as timing signals. Further, as image data that is output as the image signal DS, image data of 24 bits per pixel is continuously output for each pixel. The image data of one pixel is formed of color data of 8 bits for each color of R, G, and B. In the following description, the image data contained in the image signal DS may be referred to as "image data DS" for the convenience of description, and further only an image signal excluding the timing signals may be referred to as "image signal DS".

The gamma correction circuit 3 corrects the image data DS such that the output characteristics of light change to desired characteristics with respect to the input image signal VS. The gamma correction circuit 3 performs gamma correction based on an input/output characteristic data 81 stored in the memory 8.

Next, the uneven color correction circuit 4 corrects the image data DSγ that has been subjected to the gamma correction so as to suppress uneven color which occurs in a projected image displayed on a screen SC. In the present embodiment, uneven color is corrected by adding or subtracting correction data to or from the image data DSγ.

In contrast, the liquid crystal panel 5 functions as a light valve that performs light modulation on illumination light emitted from an illumination optical system 9 that utilizes a light source, such as a halogen lamp or the like, based on the image signal DSc. The light that has been modulated (image light) is projected and displayed on the screen SC by a projection optical system 11 that has a projection lens 10 with a zoom function.

Here, the liquid crystal projector 1 of the present embodiment includes a zoom state detection circuit 12 that detects a zoom state of the projection lens 10 with the zoom function, so that uneven color correction is performed on the image signal DSγ according to a detected zoom state as described below. Various types of detection mechanisms, such as a potentiometer and a rotary switch, may be used as the zoom state detection circuit 12. The potentiometer detects the quantity of rotation θ of a rotary cam mechanism (not shown) that moves a lens group constituting the projection lens 10 in an optical axis direction. Further, in a projection lens having a motor-driven zoom mechanism, a circuit arrangement, that detects a zoom state based on the number of steps of a stepping motor that acts as a drive source of the motor-driven zoom mechanism, can be used as the zoom state detection circuit 12.

While not illustrated, the liquid crystal projector 1 of the present embodiment includes three liquid crystal panels that subjects the respective color signals of three colors (R, G, B) to modulation, and the respective circuits 2, 3, 4, and 6 process the image signals for the three colors. Similarly, the illumination optical system 9 also includes a color light separation optical system that separates light emitted from the light source into light of three colors, and the projection optical system 11 includes a synthesization optical system that synthesizes image light of three colors into a color image. The projector optical system for color image is disclosed, for example, in Japanese Unexamined Patent Application Publication No. 10-171045 filed by the applicant. Accordingly, further description thereof is omitted in the specification.

(Uneven Color Correcting Operation)

In the liquid crystal projector 1 of the present embodiment, the memory 8 previously stores uneven color correction data 82 for an occasion that a zoom state of the projection lens 10 is at a wide-angle end and uneven color correction data 83 for an occasion that a zoom state thereof is at a telephoto end, as uneven color correction data by a method which will be described below. The control circuit 7 calculates uneven color correction data 84 corresponding to a zoom state (x) which is detected by the zoom state detection circuit 12 by linear interpolation based on these two sets of uneven color correction data 82 and 83. The uneven color correction circuit 4 performs uneven color correction on the image data DSγ using the thus calculated uneven color correction data 84.

In the present embodiment, the uneven color correction circuit 4, the control circuit 7 and the memory 8 correspond to the uneven color correction section of the present invention. Also, the zoom state detection circuit 12 corresponds to the zoom state detection section of the present invention.

As described above, in the liquid crystal projector 1 of the embodiment, uneven color correction is performed according to a zoom state of the projection lens with the zoom function. Therefore, a high quality projected image, the uneven color of which is suppressed, can be formed on the screen SC at all times regardless of a quantity of zoom of the projection lens.

Here, while the two sets of uneven color correction data 82 and 83 are utilized in the present embodiment, it is also possible to store three or more sets of uneven color correction data in the memory 8 according to zoom states, to read uneven color correction data corresponding to a detected zoom state from the memory 8, and to use the data.

An uneven color correction method will be described below. FIG. 2 is a schematic that shows an example of a projected image where a gray solid image is displayed without being subjected to uneven color correction. In FIG. 2, it is assumed that an outside frame 21 shows a region of a projected image at a wide-angle end, and that an inside frame 22 shows a region of a projected image at a telephoto end. In this case, the projected positions of pixels P1 and P2 in the projected image (21) at the wide-angle end shifts to the positions shown by pixels P1' and P2' in the projected image (22) at the telephoto end. In the example, the correction data of respective pixels is calculated as to cases in which a zoom state is at the wide-angle end and at the telephoto end. In the following description, however, only the calculation of the correction data at the pixel P2 where the zoom state is at the wide-angle end will be described. The correction data at the pixel P2' will be calculated in the same way.

Further, it is assumed that the image data DS of respective color components is gradation data of 8 bits, that is, an integer from 0 to 255. In this case, it is assumed that the luminance level of an R component is 0 Kr to 100 Kr (Kr: coefficient), that the luminance level of a G component is 0 Kg to 100 Kg (Kg: coefficient), and that the luminance level of a B component is 0 Kb to 100 Kb (Kb: coefficient). The respective coefficients Kr, Kg, and Kb show the contribution ratios of respective color lights R, G, and B to the luminance of synthesized light, and, in general, Kr=0.29, Kg=0.585, and Kb=0.114. Where attention is paid to the relative luminance level of the same color line segments, the respective coefficients can be ignored.

It is assumed that the gradation data of a gray image is 128 for each of R, G, and B, and that the luminance levels of the respective color lights of R, G, and B of an image to be displayed in this case are 50 Kr, 50 Kg, and 50 Kb. Hereinafter, these luminance levels are referred to as a "reference luminance level".

In the projected image shown in FIG. 2, the luminance level of the pixel P1 thereof is equal to the reference luminance level, whereas the luminance level of the pixel P2 for R is 40 Kr, the luminance level thereof for G is 50 Kg, and the luminance level thereof for B is 55 Kb. That is, these luminance levels are different from the reference luminance level, by which uneven color is caused in the pixel P2. The uneven color in the pixel P2 is suppressed by the following uneven color correction.

The method of suppressing the uneven color caused in the pixel P2 includes a method of correcting the level of an applied image data DSγ such that, for example, the luminance levels of the respective color components in the pixel P2 are made to be equal to the reference luminance level. In the method, since the luminance level of the R component is 40 Kr, which is lower than the reference luminance level of 50 Kr, an amount of data correction, which is required to compensate for an insufficient luminance level 10 Kr, is calculated. Further, the luminance level of the B component is 55 Kb, which is higher than the reference luminance level 50 Kb, an amount of data correction to reduce an excessive luminance level 5 Kb is calculated. Since uneven color correction is not necessary for the G component, an amount of data correction is set to zero. The thus calculated amounts of data correction are previously stored in the memory 8 as uneven color correction data. That is, uneven color correction data for each pixel is determined in the wide-angle end state and the telephoto end state of the projection lens 10, and stored in the memory 8 as the uneven color correction data 82 and 83, respectively.

The above method of calculating the amount of data correction determines correction data such that the luminance levels of the respective colors are made to be equal to the reference luminance level. In place of this method, the correction data may be determined such that, for example, one of the three color lights that form a color image is used as a reference, and the luminance levels of the other color lights are made to be equal to the luminance level of the reference for each pixel to make the chromaticity of the respective pixels equal to each other.

Further, where the amount of data correction is determined for each pixel and stored in the memory 8, the capacity of the memory for the storage increases. Thus, in general, an image to be displayed may be divided into unit blocks, each having several tens of pixels×several tens of pixels, and correction data may be allocated to respective blocks. Further, the correction data in the respective pixels in the respective blocks may be interpolated based on the correction data of the respective blocks. An ordinary method, such as linear interpolation and weighted mean interpolation, may be employed as the method of interpolation.

OTHER EMBODIMENTS

While the present invention is discussed above as being applied to the transmission type liquid crystal projector that displays a color image in the above embodiment, the present invention can also be applied to other types of projectors in the same way.

For example, the present invention can also be applied to a projector that uses a reflection type liquid crystal panel, and a projector that uses various types of display devices such as a digital micromirror device, plasma display panel, and CRT, in the same way.

Further, the present invention can also be applied to a projector that projects and displays a monochrome image in the same way.

As described above, the projector of the present invention performs uneven color correction based on a zoom state of the projection lens. Since the uneven color of a projected image is corrected in consideration of the zoom state of the projection lens, a high quality projected image, the uneven color of which is suppressed, can be formed at all times regardless of a zoom state.

INDUSTRIAL APPLICABILITY

The present invention is applicable to projectors that include projection lenses with a zoom function. In accordance with the present invention, color unevenness on projected images is corrected regardless of a zooming state of a zoom lens.

The invention claimed is:

1. A projector for use with a screen, comprising:
   a projection lens having a zoom function that forms a projected image, corresponding to an image signal, on the screen;
   a zoom state detection section that detects a zoom state of the projection lens; and
   an uneven color correction section that performs uneven color correction on the image signal based on the zoom state detected by said zoom state detection section.

2. The projector according to claim 1, the uneven color correction section including a memory in which uneven color correction data according to the zoom state is stored.

3. The projector according to claim 2, the uneven color correction section including a control circuit and an uneven color correction circuit, the memory storing and holding first and second uneven color correction data according at least to first and second zoom states, the control circuit calculating the uneven color correction data in a zoom state between the first and second zoom states based on the first and second uneven color correction data, and the uneven color correction circuit performing uneven color correction on the image signal using the calculated uneven color correction data.

4. The projector according to claim 1, further comprising a light valve that modulates at least one of transmitted light and reflected light according to the image signal.

5. A method of correcting uneven color of a projector that forms a projected image corresponding to an image signal on a screen by a projection lens having a zoom function, the method comprising:
   detecting a zoom state of the projection lens; and
   performing uneven color correction on the image signal in accordance with the detected zoom state of the projection lens.

6. The method of correcting uneven color of a projector according to claim 5, further comprising:
   calculating uneven color correction data according to the detected zoom state; and
   performing the uneven color correction on the image signal using the calculated uneven color correction data.

7. The method of correcting uneven color of a projector according to claim 6, the uneven color data calculation step including selecting uneven color correction data corresponding to the detected zoom state from a plurality of sets of uneven color correction data corresponding to previously stored and held zoom states.

* * * * *